Figure 1:
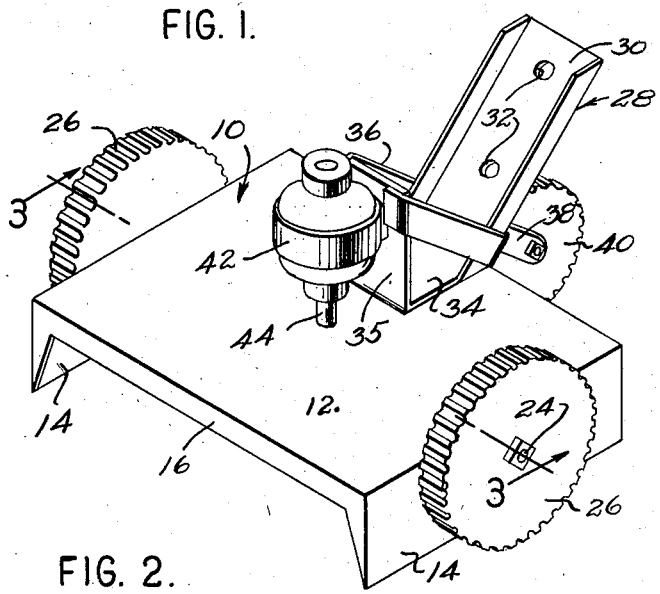

Sept. 8, 1953  J. G. ROUNTREE, SR  2,651,159
ROTARY CUTTING DISK TYPE LAWN MOWER
Filed Aug. 15, 1950

INVENTOR.
JOSEPH G. ROUNTREE SR
BY Wilfred Lawson
ATTORNEY

Patented Sept. 8, 1953

2,651,159

UNITED STATES PATENT OFFICE 2,651,159

ROTARY CUTTING DISK TYPE LAWN MOWER

Joseph G. Rountree, Sr., Beeville, Tex.

Application August 15, 1950, Serial No. 179,581

1 Claim. (Cl. 56—25.4)

This invention relates to a lawn mower and more particularly to a lawn mower of the type employing cutting blades which rotate in a horizontally disposed rotary path.

The primary object of the invention is to simplify the construction of lawn mowers of the type to which this invention relates and to enable the cutting blades to be renewed or removed for sharpening when occasion arises.

Among its features the invention embodies a bed plate which may be easily and cheaply made from sheet material, reinforcing means carried by the bed plate, ground wheels carried by the bed plate for supporting said bed plate in spaced relation to the ground, a handle socket carried by the bed plate and projecting upwardly and rearwardly therefrom, and a ground wheel carried by the handle socket.

Other features include a prime mover mounted on the handle socket and having its drive shaft extending downwardly through the bed plate, a rotor mounted on the shaft below the bed plate for longitudinal adjustment on said shaft and rotation therewith, vertically extending cutters carried by the rotor for preventing foliage from wrapping about the drive shaft, and horizontally operating cutters detachably connected to the rotor adjacent opposite ends thereof.

Figure 5:
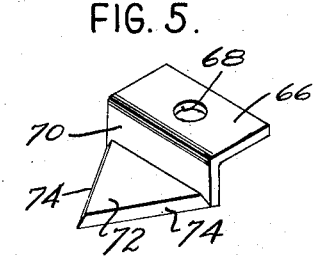
Figure 2:
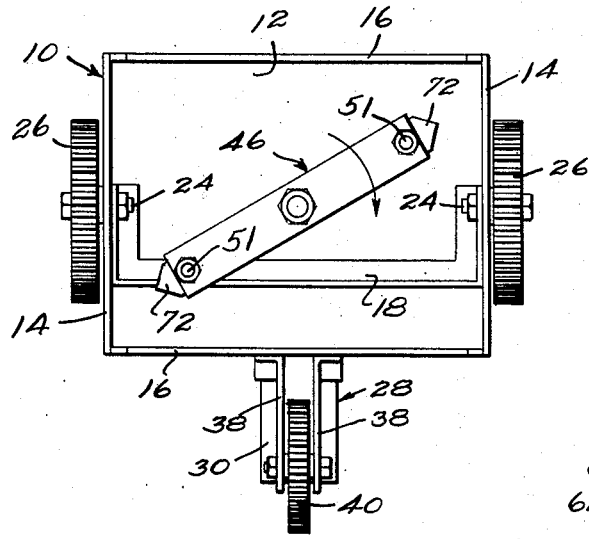
Figure 4:
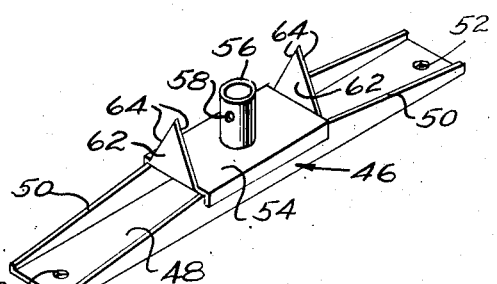
Figure 3:
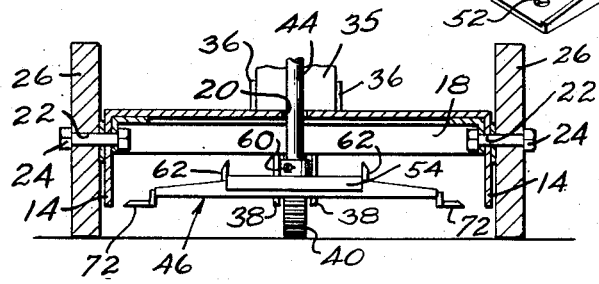

In the drawings:

Figure 1 is a perspective view of a lawn mower embodying the features of this invention, Figure 2 is a bottom plan view of the lawn mower illustrated in Figure 1, Figure 3 is a vertical sectional view taken substantially along the line 3—3 of Figure 1, Figure 4 is a perspective view of the rotor, and Figure 5 is a perspective view of one of the detachable cutting blades.

Referring to the drawings in detail the lawn mower herein described comprises a bed plate designated generally 10 which is formed of an elongated rectangular body of metal 12 which is provided along opposite side edges with downturned flanges 14 and along opposite end edges with downturned flanges 16, which flanges serve to form a rigid bed upon which the mechanism is supported. Welded or otherwise attached to the body 12 on the under side thereof is a substantially U-shaped angle member 18 which forms a stiffening and reinforcing element for the body 12. Extending through the body 12 midway between opposite sides and ends thereof is an opening 20, and formed in the vertical flanges 14 and the vertical legs of the angle member 18 which lie adjacent opposite flanges 14 are aligned openings 22 for the reception of axle bolts 24 by means of which ground wheels 26 are coupled to the bed plate 10.

Welded or otherwise attached to the bed plate 10 and projecting upwardly from the top surface thereof substantially midway between opposite flanges 14 is a handle socket designated generally 28 which comprises a downwardly inclined channel member 30 having bolt holes 32 formed therein in spaced parallel relation to one another, and carried at the lower end of the downwardly inclined channel member 30 is a foot piece 34 which extends forwardly across the top of the bed plate 10 and terminates in an upward extension or motor support 35. Reinforcing bars 36 are fixed to the motor support 35 adjacent the upper end thereof and incline downwardly and rearwardly to partially embrace the channel member 30 adjacent its junction with the bed plate 10. These members 36 are provided with inwardly offset rearwardly and downwardly extending arms 38 between which a ground wheel 40 is mounted to rotate.

Fixed to the motor support 35 is a prime mover 42 which in the present instance takes the form of a conventional electric motor having a drive shaft 44 which projects downwardly through the opening 20 so that its lower end terminates below the lower edge of the reinforcing member 18 previously referred to.

Mounted for vertical adjustment on the drive shaft 44 adjacent the lower end thereof is a rotor designated generally 46 which comprises a channel member 48 having upstanding flanges 50 extending along longitudinal side edges thereof. Formed in the channel member 48 adjacent opposite ends thereof are bolt receiving openings 52 for the reception of suitable bolts 51 by which cutting blades, to be more fully hereinafter described, are attached to the rotor 46. Carried by the flanges 50 substantially midway between opposite ends of the rotor 46 is a saddle member 54 carrying an upwardly extending centrally disposed socket 56 into which the lower end of the shaft 44 is received. This socket is provided with a radial internally screw threaded opening 58 for the reception of a set screw 60 by which the rotor 46 is held for rotation with the shaft 44 as well as longitudinal adjustment thereon. Opposite ends of the saddle member 54 are provided with upstanding cutting blades 62 of substantially triangular shape which carry convergent sharpened edges 64 so that any fibrous material which may find its way upwardly beyond the rotor 54 will be cut before it can wrap itself about the shaft 44.

The mowing blades previously referred to are best illustrated in Figure 5 and each comprises an attaching plate 66 which is provided with an opening 68 which is adapted to register with an opening 52 in the rotor 46 to receive an attaching bolt 51 by which the blade is detachably coupled to the rotor. The base plate 66 is provided with a downwardly extending flange 70 carrying at its end remote from the plate 66 a horizontally extending cutting blade 72 of substantially triangular form. The convergent edges 74 of the cutting blade 72 remote from the edge which joins the flange 70 are sharpened as illustrated in Figure 5 so that with the cutter in place on the rotor 46, and moving in a horizontal circular path, any vegetation encountered by the cutting blades will be severed from its root.

In operation it will be understood that a suitable handle is coupled to the handle socket 28 by extending bolts through the handle and through the openings 32 and by connecting the prime mover 42 to a suitable source of electrical power, it may be energized to rotate the drive shaft 44. As the shaft 44 is rotated, the rotor 46 will rotate in a circular path beneath the bed plate 10 and by advancing the device on its ground wheels 23 and 40, it is evident that the rotor may be advanced toward the vegetation to be cut. Should the cutting blades carried by the ends of the rotor 46 become dulled or otherwise unusable, they may be removed from the rotor for sharpening or replacement. Any vegetation which fails to be cut by the cutting blades carried by the ends of the rotor and which may be encountered by the cutting blades 62 will be severed from its root before it can become entangled about the drive shaft 44.

While in the foregoing there has been shown and described the preferred form of this invention, it is to be understood that minor changes in the details of construction, combination and arrangement of parts may be resorted to without departing from the spirit and scope of the invention as claimed.

I claim:

In a lawn mower, including a horizontally wheeled bed plate and a motor mounted above the bed plate with its rotor shaft depending centrally through the bed plate, an elongated cutter bar of U-channel form in cross-section, the side flanges of said bar tapering off equally in opposite directions from elongated central portions of uniform height, cutting elements removably secured in the ends of the channel, a second cutter bar of inverted U-channel form in cross-section seated over the said central portions, said second cutter bar being of equal length to that of said central portions, and triangular cutting elements upturned from the ends of the intermediate portion of said second cutter bar, said cutter bars being centrally apertured to receive the lower end of said shaft.

JOSEPH G. ROUNTREE, Sr.

References Cited in the file of this patent

UNITED STATES PATENTS

| Number | Name | Date |
|---|---|---|
| 578,250 | Holland-Letz | Mar. 2, 1897 |
| 1,805,927 | Sharp | May 19, 1931 |
| 1,868,347 | Cloud | July 19, 1932 |
| 1,954,579 | Smith | Apr. 10, 1934 |
| 2,171,750 | Hool | Sept. 5, 1939 |
| 2,245,821 | Poynter | June 17, 1941 |
| 2,518,093 | Sutter | Aug. 8, 1950 |
| 2,564,586 | Smith et al. | Aug. 14, 1951 |